(12) United States Patent
Mattison

(10) Patent No.: US 7,010,177 B1
(45) Date of Patent: Mar. 7, 2006

(54) PORTABILITY OF DIGITAL IMAGES

(75) Inventor: Phillip E. Mattison, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/141,210

(22) Filed: Aug. 27, 1998

(51) Int. Cl.
*G06K 9/60* (2006.01)

(52) U.S. Cl. .................. 382/305; 382/295; 382/307; 709/315; 709/332

(58) Field of Classification Search ............... 382/276, 382/248, 295, 300, 305, 311, 219, 209, 215, 382/302, 303, 306, 308, 307, 284, 294; 707/500, 707/515, 523, 516; 705/1, 2, 3, 8, 17, 18; 719/311, 312, 315, 332
See application file for complete search history.

(56) References Cited

U.S. PATENT DOCUMENTS

| | | | | |
|---|---|---|---|---|
| 5,495,581 A | * | 2/1996 | Tsai ............................ | 395/154 |
| 5,537,157 A | | 7/1996 | Washino et al. ............ | 348/722 |
| 5,708,853 A | * | 1/1998 | Sanemitsu .................. | 395/893 |
| 5,752,055 A | * | 5/1998 | Redpath et al. ............. | 395/777 |
| 5,762,552 A | * | 6/1998 | Vuong et al. ................ | 463/25 |
| 5,778,378 A | * | 7/1998 | Rubin ........................ | 707/103 |
| 5,848,413 A | * | 12/1998 | Wolff ......................... | 707/10 |
| 5,854,693 A | | 12/1998 | Yoshiura et al. ............ | 358/468 |
| 5,872,978 A | * | 2/1999 | Hoskins ...................... | 395/707 |
| 5,873,077 A | * | 2/1999 | Kanoh et al. ................. | 707/3 |
| 5,884,262 A | * | 3/1999 | Wise et al. ................. | 704/270 |
| 5,907,640 A | * | 5/1999 | Delean ....................... | 382/276 |
| 5,928,335 A | * | 7/1999 | Morita ....................... | 709/303 |
| 5,982,994 A | * | 11/1999 | Mori et al. ................. | 395/114 |
| 6,005,613 A | * | 12/1999 | Endsley et al. ............. | 348/231 |
| 6,104,430 A | * | 8/2000 | Fukuoka ..................... | 348/232 |
| 6,161,148 A | * | 12/2000 | Pratt et al. .................. | 709/315 |
| 6,166,729 A | * | 12/2000 | Acosta et al. ............... | 345/327 |
| 6,215,495 B1 | * | 4/2001 | Grantham et al. .......... | 345/419 |
| 6,260,021 B1 | * | 7/2001 | Wong et al. .................. | 705/2 |

OTHER PUBLICATIONS

IEEE publication by Terry Montlick, "What is object-Oriented software" copyright 1995-1999 by software design consultants, LLC.*

* cited by examiner

*Primary Examiner*—Bhavesh M. Mehta
*Assistant Examiner*—Yosef Kassa
(74) *Attorney, Agent, or Firm*—Blakely, Sokoloff, Taylor & Zafman LLP

(57) ABSTRACT

Techniques for storing and translating digital images of different native formats in a way that makes it unnecessary for independent manufactures of imaging devices such as digital cameras to agree on factors related to production/capture and processing of the images. Image data in a native format and an associated method are combined as part of an image object, within the meaning of classical object-oriented technology, and transferred to the host system. An abstract machine, such as a virtual machine, in the host system acts as a virtual image processor and executes the method to obtain image data in a common format. The method in each image object operates on its corresponding image data to yield an image in a common format.

18 Claims, 4 Drawing Sheets

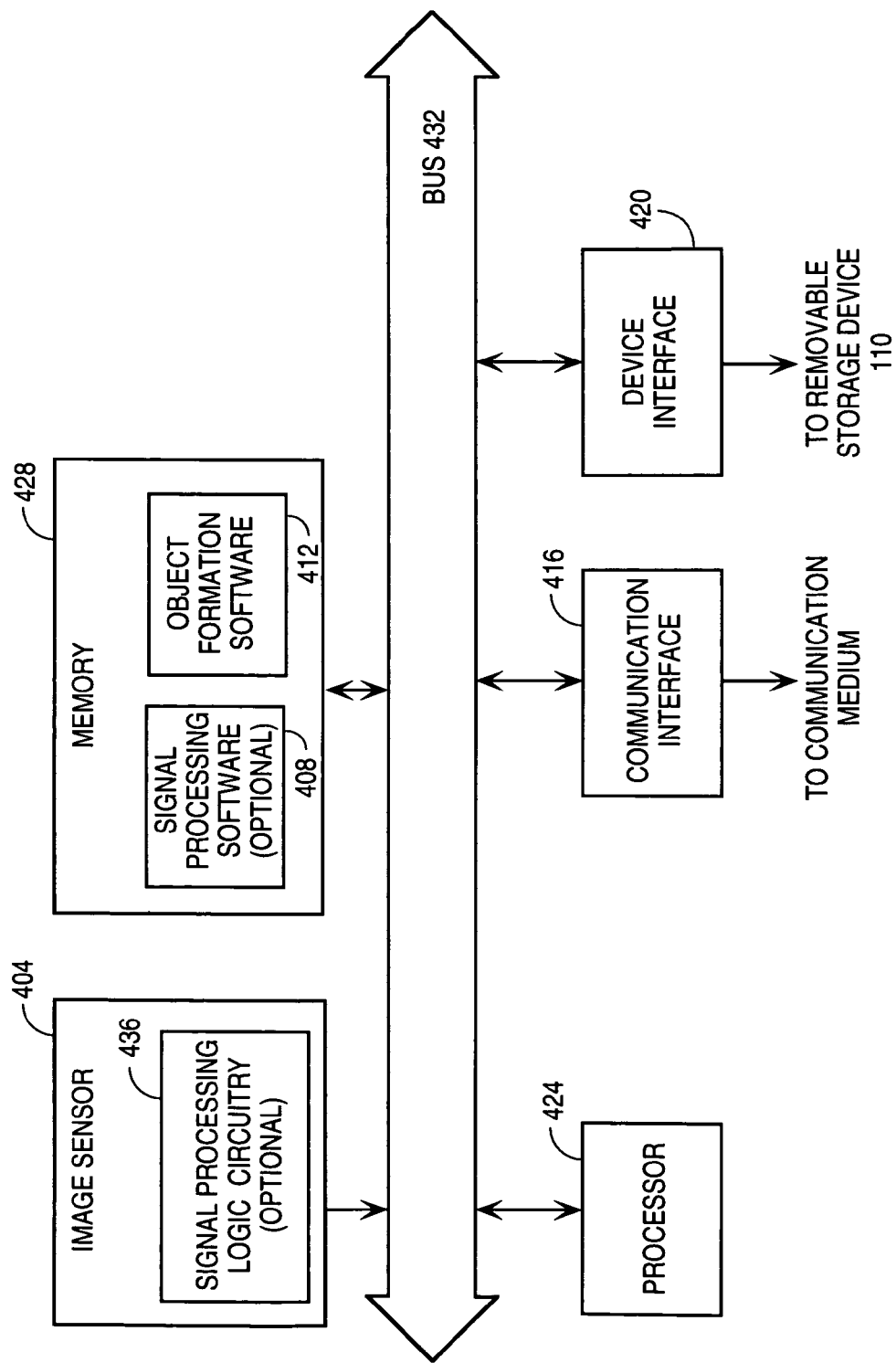

PORTABILITY OF DIGITAL IMAGES

BACKGROUND INFORMATION

1. Field of the Invention

This invention is generally related to digital imaging, and, more specifically, to techniques of packaging digital images that may be in different native formats and translating them into a common format.

2. Related Art

The increasing availability of digital imaging devices such as the digital camera has created an unprecedented opportunity for the convergence of the personal computer (PC) industry and the photographic industry. The pictures produced by digital cameras are ideally suited for use with a PC, making the marriage of digital cameras and personal computers seem perfect. There is, however, a significant obstacle to this union.

The current practice in the digital photography business is for manufacturers to develop digital cameras independently of one another. This is not likely to change. Each such new camera is typically bundled with a vertically integrated software package that allows images to be viewed on a host processing system. The software is designed specifically to work with that camera and does not support compatibility with different types of digital cameras or cameras from different manufacturers. There is little or no agreement between manufacturers on how the digital images should be stored aboard the camera, how they should be processed before they are stored, or how the host system (e.g., PC) should handle them.

The closest conventional attempt at a standard for the transfer of images between the device and host is the Twain driver. The Twain driver is a software module that provides a standard interface to application programs for retrieving digital images from an imaging device. The module translates images from the imaging device's native format into some common format used by the application. Examples of such common formats include the red, green, and blue (RGB) bitmap and the device independent bitmap (DIB) as defined by Microsoft Æ Corp.

Different types of digital cameras often use different native formats for storing digital images. A Twain module specific to a given combination of device, native format, and host operating system (OS) could be stored aboard the digital camera. The Twain module could then be transferred to each new host along with the image data. However, it may not be practical to store such a module aboard a digital camera because of limited memory resources in digital cameras. Also, such modules interact directly with the host operating system, thus creating a security risk as viruses in the camera may be propagated into the host system. Finally, the Twain module is typically written in code that is specific to a particular host processor, making the Twain solution not truly portable.

It would therefore be desirable to have a technique that allows different types of imaging devices that store digital images in different native formats to communicate with a host system to allow the viewing or processing of such images in a common format aboard the host, without having to also load a bulky device-specific Twain driver into the host system.

SUMMARY

The invention in one embodiment is directed at an imaging device having an image sensor for generating sensor data and memory for storing an image object. The image object has image data being related to the sensor data and an image method for being executed by an abstract machine to obtain translated image data based upon the image data.

The above briefly summarized features of an embodiment of the invention, as well as other features and advantages of other embodiments, will be apparent from the following detailed description, claims, and figures.

BRIEF DESCRIPTION OF THE DRAWINGS

FIG. 4 shows part of an imaging device including software and hardware elements configured according to another embodiment of the invention.

DETAILED DESCRIPTION

As briefly summarized above, the invention in one embodiment gives manufacturers of imaging devices such as a digital camera the ability to select their own native format for capturing and storing digital image data, while at the same time making it unnecessary for the host system to have specific knowledge of the particular imaging device that produced the images. The data for an image is stored as part of an object. Thus, each image, rather than being represented as an image file, is packaged as part of an image object in the classical sense of object-oriented software. The image object contains both image data and an associated method. This method is the intelligence needed to support a translation from the native format into a common image file format. Each method defines the translation specific to the native format of its associated image data.

Software in the host system that interprets and executes the image methods may become common to all host processing systems, regardless of hardware and operating system, and can be developed and distributed independent of the imaging devices. Such software is in effect an object execution environment such as a virtual machine. As there is no dependency between the virtual machine and the received image data, new and different imaging devices may be developed independently of developments in the common format and application software. The common format also eliminates the need for application developers to recognize and handle different image file formats currently in use. The image object frees imaging device manufacturers from having to determine what is the best format for storing images aboard the imaging device, or what is the best method for processing them. Such a solution is particularly advantageous because changes or improvements in the virtual machine and/or the common image file format will probably occur much less frequently than the changes in the imaging devices or the application software.

Figure 1:
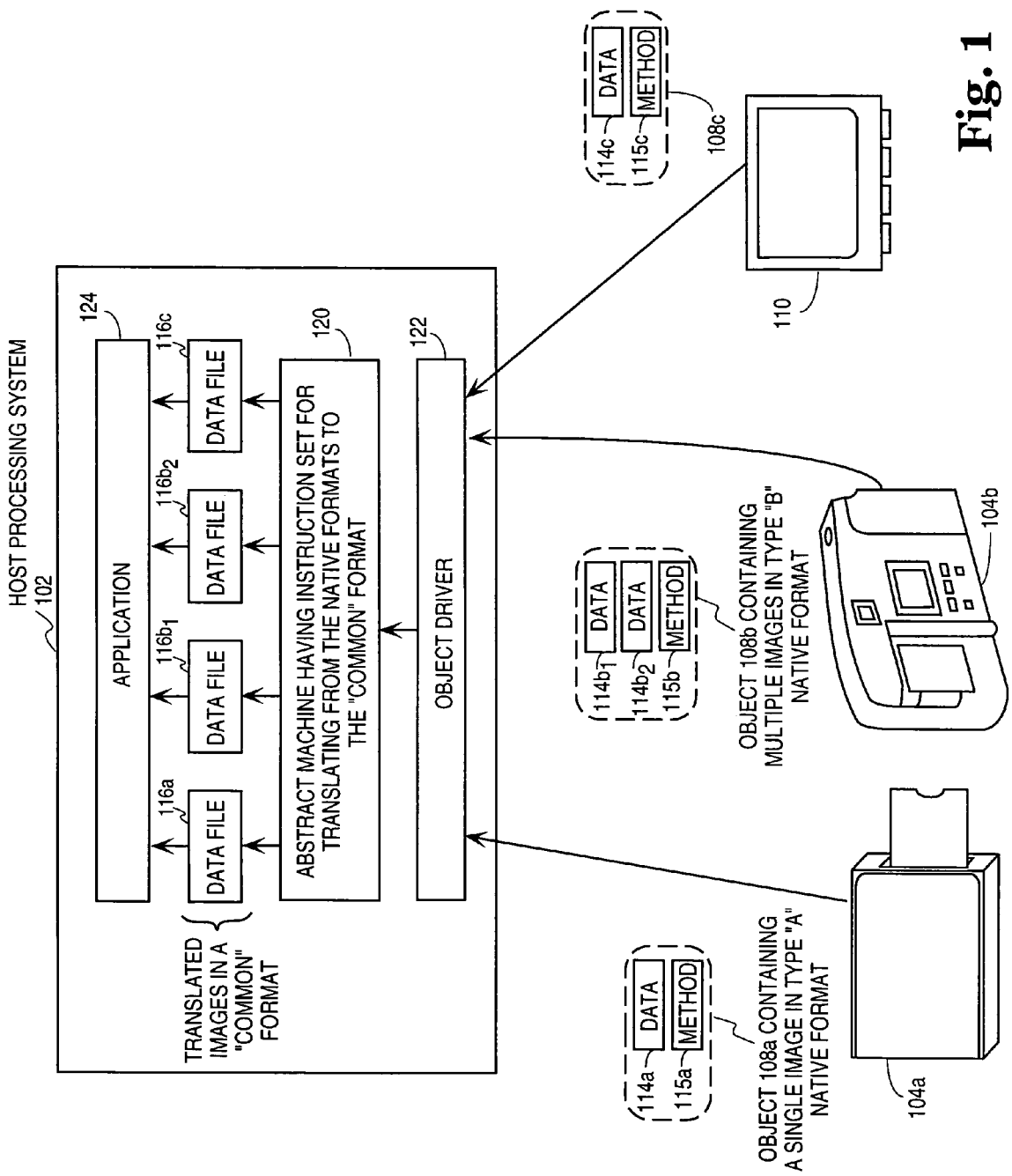
FIG. 1 is an overall system view of an imaging system according to an embodiment of the invention.

FIG. 1 presents an overall system view of various embodiments of the invention in which image objects are formed or stored in different imaging devices 104a and 104b and storage device 110 before being transferred to a host system 102. Each object 108a, 108b, or 108c includes at least one data portion that is the image data in a format native to the particular type of imaging device that was used to capture the image data. For instance, device 104a may be a scanner configured to generate an object 108a that represents a single image obtained using the device. In contrast, device 104b may be a digital camera configured to generate a single object 108b that has two data portions $114b_1$, and $114b_2$ representing two still images.

Once the objects are transferred to the host system 102, their methods are interpreted and executed by the abstract machine 120, resulting in data files 116a (from object 108a), $116b_1$ and $116b_2$ (from object 108b), and 116c (from object 108c). These files will contain digital images in a predefined common format. The data files may then be accessed by application 124 to manipulate or display the image in each data file. The application 124 may be designed to further translate the images into one of numerous other file formats, including Joint Photographic Experts Group format (JPEG), Graphics Interchange Format (GIF), Interchange File Format (IFF), and Tagged Image File Format (TIFF). For convenience, the discussion below will only refer to the interaction between device 104a, object 108a and associated data and methods 114a and 115a. However, it will be recognized that the discussion is not limited to only such an embodiment and also applies to alternative devices, object, data, and methods, including those shown in FIG. 1.

Figure 2:
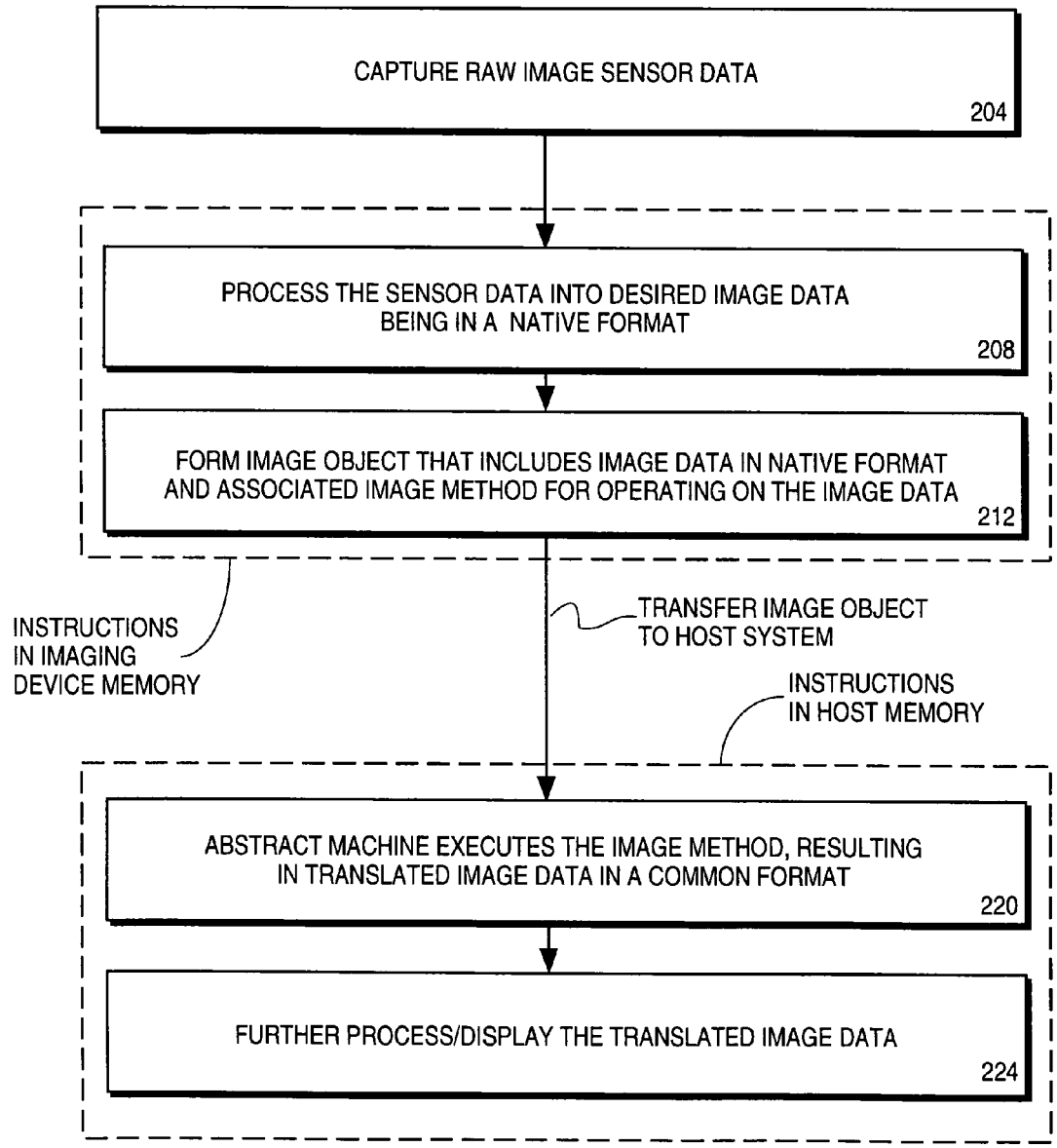
FIG. 2 shows steps performed to improve the portability of digital images according to another embodiment of the invention.

The steps performed in one embodiment of the system of FIG. 1 are presented in FIG. 2 to help better appreciate some of the differences between the embodiment of the invention and the conventional technique of using the Twain module to transfer image data from device to host. The technique of creating and transferring portable image data according to one embodiment of the invention may begin with step 204 in FIG. 2 with the capture of raw sensor data. This may be done according to known techniques associated with an imaging device such as a digital camera. Next, image data 114a in a predefined native format is formed based on the raw sensor data. In one embodiment, the raw sensor data is processed by the imaging device 104a according to conventional and/or proprietary operations such as noise removal, color interpolation, image compression, and scaling to obtain data in the desired native format as indicated in the step 208. Alternatively, step 208 may be skipped with no significant processing being performed upon the raw sensor data. In that case, the raw sensor data is considered to be in the native format. The amount of processing in step 208 involves potential performance tradeoffs to be discussed below. Operation then continues with step 212.

In step 212, the imaging device 104a forms an object 108a that includes the image data 114a and an associated image method 115a. The image method 115a is a program or list of instructions to be executed by the abstract machine 120 for translating the image data from the native format to a predefined common format. The method 115a is based on the instruction set of the abstract machine 120. In most cases, the method is expected to be significantly smaller than the conventional Twain module because the instruction set of the abstract machine can be optimized for image processing and because resource allocation, such as memory allocation, can be built into the abstract machine 120 rather than in the method.

After the image object 108a has been formed in the imaging device, operation in FIG. 2 continues with the transfer of the object to the host system. This may be performed using well known communication media for the transfer of image data, such as a wire link, or using a removable storage device 110 such as a non-volatile memory card.

The interface between the communication medium and the abstract machine 120 in the host system is the object driver 122. The object driver 122 communicates with appropriate hardware and software (including the operating system) in the host system 102 to make the object 108a available to the abstract machine. The object driver launches the abstract machine under the local OS and eventually causes it to execute the method. In one embodiment, the object driver 122 includes the well known software driver for retrieving files that are configured according to the Tagged Image File Format (TIFF). TIFF is a popular format for storing bit-mapped images on PC's and Macintosh Æ computers and can be used to implement the object 108a. Other techniques for implementing the object 108a and its associated driver 122 may be used as recognized by one of ordinary skill in the art.

A loader (not shown) loads the method into the abstract machine and passes it a pointer to the image data. The loader also recognizes certain fields of the image object such as the image count and iteratively initializes the abstract machine to process each image in turn as in step 220. This results in translation and processing of the image data 114a into translated image data in a common format. The translated data is normally placed in a separate data file 116a and may be stored in a mass storage device such as a hard disk drive. This data file 116a may then be further processed into a desired finished form by the application 124.

Figure 3:
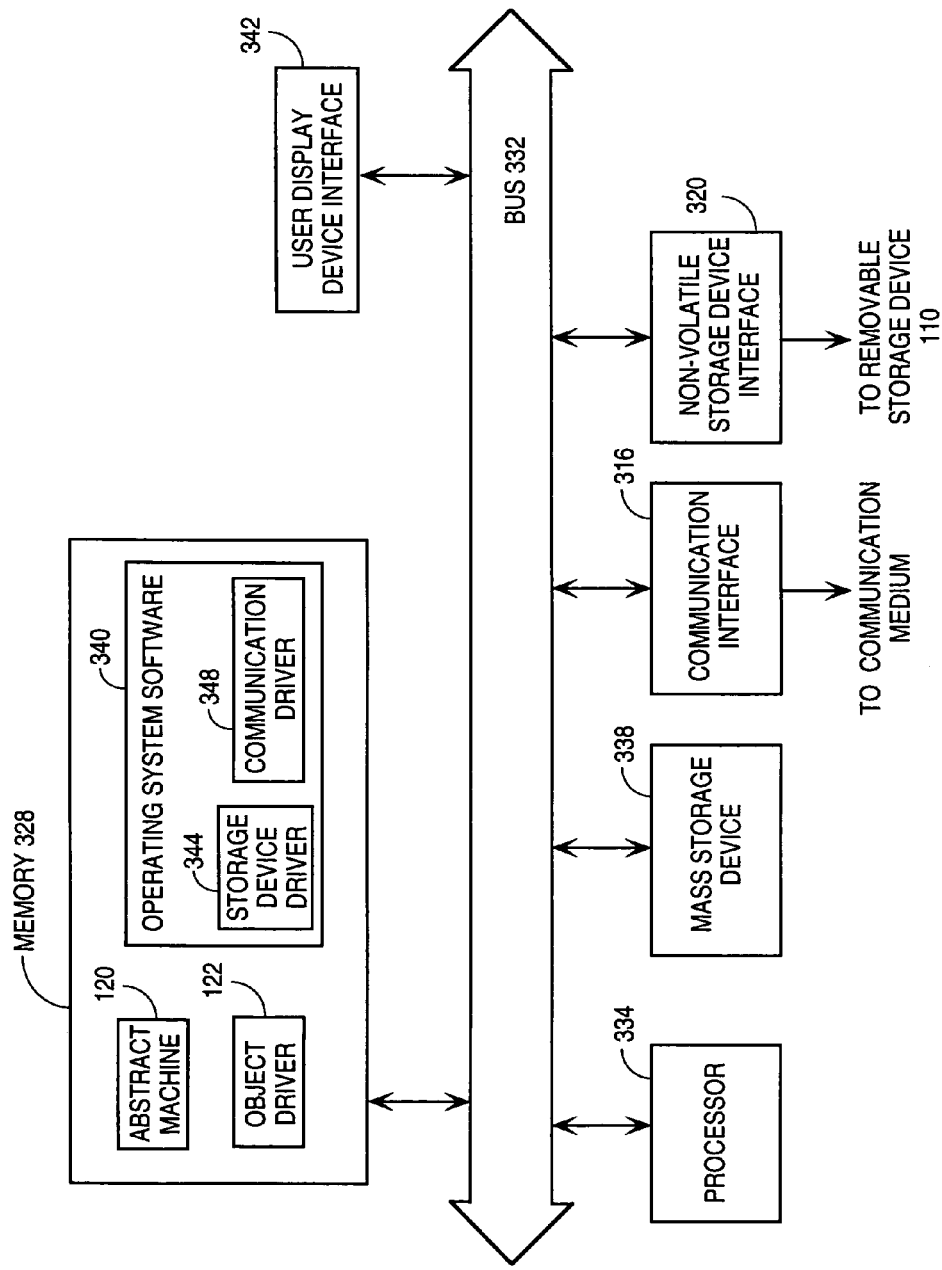
FIG. 3 shows a host processing system including software and hardware configured according to another embodiment of the invention.

Having described an embodiment of the invention from an overall system point of view, FIGS. 3 and 4 illustrate other embodiments of the invention as imaging device 104a and the host system 102. FIG. 3 is an embodiment of the host processing system 102 including software and hardware configured to accept and process the image object 108a. This particular embodiment is centered around a bus 332 to which a processor 334 is coupled. The system 102 may be a conventional personal computer having an Intel Æ processor and a Microsoft Æ Windows Æ graphical user interface and operating system. Although the operating system software 340, the object driver 122, and the abstract machine 120 are shown as being separately loaded in memory 328, one of ordinary skill in the art will recognize that these software components may at times be combined in whole or in part, and distributed between the memory 328, the mass storage device 338 (e.g., magnetic rotating disk), and a portable memory such as an optical compact disc (not shown).

The processor 334 executes instructions stored in memory 328 (e.g., random access memory (RAM)) and mass storage device 338. The memory 328 is any machine-readable medium such as a semiconductor integrated circuit that may be loaded with instructions that when executed by the processor 334 cause the steps of configuring the host processing system 102 to receive and process objects from different imaging devices and storage devices.

The host processing system 120 also contains a communication interface 316 that complies with any one of conventional computer peripheral bus standards, including RS-232 serial, universal serial bus (USB), and IEEE Standard 1394-1995. In addition to communication via a physical wire, wireless communication media are also contemplated using, for instance, infrared or radio frequency for data transmission. As another alternative to the communication medium, a number of different removable storage devices are contemplated, including Personal Computer Memory Card International Association (PCMCIA), Flash Miniature Card by Intel and any other non-volatile storage media suitable for transporting digital image data.

The host processing system 102 of FIG. 3 also features a user display device interface 342 such as a graphics adapter card that interfaces any conventional display device including a cathode ray tube (CRT), liquid crystal display (LCD), and any other display technique suitable for viewing electronic images. Of course, the host processing system 102 may also feature additional interfaces (not shown) for performing additional I/O (e.g., network interface controller).

Having discussed the host portion of a system embodiment of the invention, FIG. 4 illustrates the imaging device 104a including its software and hardware elements. Once again, the embodiment of FIG. 4 is based on a bus 432 to which a processor 424 and memory 428 are coupled. An alternative here is a microcontroller that supplants the processor 424 and memory 428. The memory may be a machine readable medium such as semiconductor integrated circuit RAM or a non-volatile semiconductor memory such as read only memory (ROM). The memory 428 is loaded with instructions to be executed by the processor 424 that cause the combining of image data 114a and method 115a as part of an image object 108 (see FIG. 1). Such instructions are collectively indicated as object formation software 412 in FIG. 4. The image method 115a is normally developed as a separate piece of software as described below.

The memory 428 may also include optional signal processing software 408 that is used to process raw sensor data received from the image sensor 404 into the image data 114a in a native format. Image processing logic circuitry 436 may also be included in the imaging device 104 for obtaining better performance when processing the raw sensor data. The logic circuitry 436 may be integrated into the die of the image sensor 404, which in one embodiment may be a complimentary metal oxide semiconductor (CMOS) active pixel sensor.

Although not shown in FIG. 4, the memory 428 also stores software to be executed by the processor 424 for accessing the interfaces 416 and 420 to communicate with devices outside the imaging device 104a. Interface 416 to a communication medium may be one that complies with a computer peripheral bus standard that was discussed above in connection with the host system. Similarly, the interface 420 may connect a removable storage device such as a flash memory card for non-volatile storage and transportation of the image object 108a.

The embodiment of the invention in FIG. 4 uses a primarily software-based processor and bus architecture for forming and transferring the image object 108a to the host system 102. An alternative to this could be a primarily hardware-based architecture based on gate arrays and application specific integrated circuits (ASICs) which perform the same functions described earlier in forming and transferring the image object 108a.

The Abstract Machine and the Image Object

The remaining portion of this disclosure discusses techniques for implementing the image object 108a and the abstract machine 120, including a set of instructions that may be used in constructing the image methods 115a.

As discussed earlier, the object 108a may be implemented as a Tagged Image File Format (TIFF)/Electronic Photography (EP) structure or file. The TIFF file includes a file header that points to the location of the image data 114a and associated method 115a. The TIFF file and its file header can be accessed by the object driver 122 and made available to the abstract machine 120.

The procedure for developing the image method 115a may begin by the developer of the imaging device 104a comparing the predefined native and common formats. An algorithm is developed to translate the image data 114a from the native format to the common format. Such algorithms are either well known or can be easily developed by those of ordinary skill in the art. The algorithm is then implemented in a program using a high level programming language such as C and/or a low level instruction set of the abstract machine 120 described below. The program is then tested and optionally optimized. The program is then compiled into byte code that represents the low level instructions. This becomes the desired image method 115a. The method is then stored in non-volatile memory (e.g., memory 428) aboard the imaging device 104a as part of the object formation software 412 (see FIG. 4).

The storage overhead required by the image object 108a residing in the imaging device 104a may be of concern in portable applications such as digital cameras where storage area is typically at a premium. The overhead depends on, (1) the amount or complexity of processing required to transform the image data 114a from its native format to the common format, and (2) the size of the data 114a in its native format. By selecting a native format that is computationally close to the predefined common format, the image method 115a becomes a relatively short list of simple mathematical or data movement instructions. In comparison, the method 115a is likely to be relatively large if needed to decompress the image data 114a from a highly compressed native format (e.g., JPEG or fractal technology) into the common format. In the latter case, any gains in storage space obtained by compressing the image data are mitigated by the more complex and lengthy method needed for decompressing the image data.

To address the concern for storage space, the abstract machineis instruction set based upon which each method is formed may be highly optimized. For instance, the locations of input buffers (for receiving the image data 114a) and output buffers (for storing the translated data in the common format) that may be used by the abstract machine 120 can be implicit. Address calculations and the majority of the data movement may be performed implicitly by the abstract machine 120 rather than by specific instructions in the image method 115a. The method thus need only concentrate on the algorithm needed to translate its associated image data 114a into the common format.

In addition to optimizing the instruction set to keep the image method 115a compact, another way to save storage area aboard the imaging device is to associate a single copy of the method 115a with multiple sets of image data, as shown in object 108b of FIG. 1. In this way, the single image object 108b contains multiple images in the image data $114b_1$ and $114b_2$, becoming in effect like a conventional roll of film where executing the method 115b would be roughly equivalent to developing the film.

In addition to storage space, another concern for the imaging device manufacturer may be protecting the intellectual property in image processing methodologies. Such processing may be performed on raw sensor data to improve final image quality, e.g. interpolating color filter array patterns, gamma correction, white balance algorithms. Rather than fill the method 115a with these image processing algorithms, thus exposing the algorithms to potential competitors when the object 108a is transferred to the host system 102, the manufacturer of the imaging device 104a may wish to have key image processing functions performed inside the imaging device. This results in image data 114a that are strongly processed versions of the raw sensor data. Taking this to one extreme, those manufacturers who wish to strongly protect their image processing technology could embed all of such processing within the imaging device, resulting in their image data 114a being in the common format. In that case, the corresponding method 115a does nothing but copy the data 114a to an output buffer in the host system 102. At the other extreme, image processing inside the imaging device 104a may be kept to an absolute minimum by simply not performing any processing on the raw sensor data before packaging the image data 114a into the object 108a. The method 115a will define all processing needed to reach the common format, and the abstract machine 120 in the host system performs all of such processing to achieve image data in the common format.

Virtual Machine Architecture

One example of an abstract machine 120 is a virtual machine. The virtual machine is a self-contained operating environment that behaves as if it were a separate computer that executes the image method 115a. The virtual machine helps shield the host system from any viruses that may have been in the received object 108a. The virtual machine may have an instruction set, a register set, and a model of memory independent of the hardware platform of the host processing system 102. An example of an available virtual machine with a well-known interpreter, programming languages, and related tools is the JAVA™ virtual machine and programming language.

In general, the virtual machine should be optimized to allow relatively small code to be written for the image method 115a. Other desirable features are a simple virtual machine interface and speedy code compilation, using, for instance, the known technique of just-in-time code translation, for interpreting the method 115a. The virtual machine should allow dynamic memory allocation to create buffers for temporary data storage while executing the method 115a. The overhead required in the method 115a for memory management can thus be minimal. Also, the host system 102 should have sufficient resources (e.g., memory) available relative to those needed by the image object 108a, such that the host system is able to grant any legitimate request by the image object 108a.

Consideration should also be given to the instruction set of the virtual machine. For the embodiment of FIG. 1 which is concerned with imaging technology, the instruction set should be optimized for image processing. For instance, there may be no need for instructions that handle character strings, multi-task execution, or graphical user interfaces. The instruction set should be designed to have enough flexibility to permit the translation of several different native formats for the image data 114a into a common format. Any functions provided in the virtual machine and its instruction set should assume no knowledge of any native formats that can be used for storing the image data 114a.

Yet another consideration for the instruction set is the support of a stack-oriented flow control (call/return/push/pop) with a relatively deep stack. For instance, the host system 102 that implements the virtual machine may provide sufficient resources for an expandable virtual stack that can handle any legitimate stack usage by the object 108a. In addition, the virtual machine should provide programming constraints that can take advantage of parallel processing support if available on the host system 102, particularly because parallel processing may be a key performance enhancement for image processing algorithms. Finally, the virtual machine may also provide flexible exception handling with defined default behavior for every potential exception. Support for high level flow control (if/for/while/case) is also desirable to simplify programming as much as possible and minimize flow control overhead in the object 108a. Flexible type checking is also another feature that may be necessary when casting from one type of variable to another.

Exemplary Virtual Machine—The Virtual Image Processor

The virtual machine in one embodiment may be the virtual image processor (VIP) described below. In that embodiment, no traditional I/O support is contemplated for the VIP as no user intervention is expected. The VIP exists solely to process image data 114a as input in a native format and to produce image data as output in the common format. The memory resources required for such a task would normally be provided by the host system 102, so that the programmer of the image object 108a need not be cognizant of exactly how the memory resources are provided.

As will be apparent from the description below, the instruction set of the VIP may bear little resemblance to that of a conventional hardware microprocessor. This is in part because of the desire to reduce the code size of method 115a and because of the emphasis on mostly mathematical processing of image data 114a. The instruction set of the VIP should allow operations required for image processing to be specified in the minimum possible space. For instance, flow control instructions can be greatly simplified over those in conventional microprocessors, because a relatively large amount of associated complexity may be built into the VIP rather than the instruction set. A single instruction can thus trigger events that would be too complex for implementation in the conventional hardware microprocessor. Also, instructions for the VIP may have variable numbers of operands and imply far more than they would in a hardware microprocessor. Mathematical expressions need not be broken down into a sequence of data movement instructions with discrete math operations designed to use a limited set of physical registers. Instead, expressions are directly represented in the image method 115a and interpreted by the VIP. Assignment expressions may be represented as a target register followed by the expression in Reverse Polish Notation (RPN). Operators may therefore be encoded directly into the image method 115a as components of expressions rather than as machine instructions. The rules governing type cast and automatic conversions may be implicit in any expression.

There are seven program control instructions and five data manipulation instructions that are contemplated in this embodiment:

| Instruction | Description |
| --- | --- |
| goto | Transfer program control |
| ifgoto | Conditionally transfer program control |
| select | Indexed program control transfer |
| call | Transfer program control to a sub program |
| return | Return program control from a sub program |
| exit | Terminate execution of the VIP program normally |
| abort | Terminate execution of the VIP program abnormally |
| push | Push a primitive data variable onto the data stack |
| pop | Pop a primitive data variable from the data stack |
| move | Move data and optionally evaluate an expression |
| create | Create a new data element for program use |
| destroy | Release a created data element |

The program control instructions are used to direct the flow of program execution. Unlike in a conventional microprocessor there are not a large number of conditional branch instructions. Also, there is direct support for an indexed jump (corresponding to the switch statement in the C programming language). Target address sizes are variable depending on the overall size of the method 115a.

The data movement instructions are the ones that actually do the work of translating and processing an image. In one embodiment, there are no instructions that directly implement math or logic operations because these operations are embedded in the operand list associated with each instruction. Also, unlike a conventional microprocessor, the operand list for an instruction can have a variable number of operands.

The push instruction pushes one data variable onto the data stack. Note that the data stack is distinct from the program flow control stack. The push instruction can only be used to push individual primitive data types onto the data stack. That is, it cannot be used to push entire arrays onto the stack. The format of the push instruction is an operation code followed by the index of the data variable representing the data to push onto the stack. The type and size of the data variable are encoded into the operand.

The pop instruction pops one data variable from the data stack. The associated data variable need not be of the same type as the data previously pushed onto the stack. If the variable type does not match the existing data type at the top of the stack, an automatic type cast will be performed according to the same rules governing type cast for the higher level programming language being used to define the method 115a.

The move instruction transfers data from a source to a destination, optionally evaluating an expression encoded in the source. That is, the source need not be a single variable, and can be an arbitrarily complex expression encoded using Reverse Polish Notation (RPN).

The create instruction dynamically creates a new data variable and assigns a reference to that variable. The variable created can be a single primitive data type or an array of primitive data variables. The destroy instruction releases memory allocated for data variables by the create instruction. A compiler for the higher level programming language used to define the method 115a may use the create and destroy instructions to manage dynamic memory for automatic variables used in sub-programs of the method 115a. This is distinct from the normal practice in the C programming language of using the stack to create automatic variables. Because the VIP is not intended for implementation as a physical microprocessor there need not be any corollary of a hardware stack.

VIP High-Level Language

Because the instruction set for the VIP is optimized for a virtual implementation of an image processor, a low level programming language such as assembly for the VIP may bear little resemblance to that of conventional assembly language for microprocessors. It may also be impractical to implement a full version of a high level language such as C or C++ for use in defining the method 115a, because of the limitations inherent in the imaging-suited optimizations discussed above. Therefore an appropriate compromise may be a subset of the C language. Programs written for the VIP using such a subset of C may have no link step. Rather, they would be compiled as a single file, or as a series of include files (ultimately a single file).

Declarations

The data types allowed are those used with the instruction set discussed earlier. Pointers are to a defined type (i.e. no void pointers). A pointer to a pointer would be allowed but not more than double indirection. Multidimensional arrays are declared the same as in conventional C. The typedef and struct declarators behave as expected. Complex data types such as struct can be used as elements in arrays. Some conventional functions, such as bit fields, are essentially meaningless in the context of the VIP embodiment, and therefore for the sake of simplicity bit fields are not allowed.

Type Qualifiers

The const type qualifier is allowed in the VIP, but the volatile qualifier has no meaning as variables are not visible to any processes outside the scope of a VIP program (e.g., method 115a). Techniques for handling complex data types such as struct are not provided in the method 115a, but are inferred from the structure definitions in the compiled VIP code. This is a key difference between the VIP and a conventional microprocessor. For example:

```
struct
{
double real_part;
double imaginary_part;
} complex[10];
short index=1;
complex[index].real_part=0.0;
```

With a conventional compiler, the assignment statement shown in the code segment above would be broken down into a series of instructions to calculate the address of the structure field based on the known displacements of its constituent parts from its base address. With the VIP, however, there is no direct corollary of a linear address space as every data item is assigned a unique ID number. The data items may or may not be contiguous in memory. The VIP resolves the complex data type reference into a single ID number that uniquely distinguishes the desired variable. The VIP can distinguish between ID numbers and array indices, so there is no ambiguity. The preceding example is an array of structures, each structure containing two data items. After compilation, this could be represented as:

```
double real_part[10];
double imaginary_part[10];
```

This would result in the equivalent assignment statement:
```
real_part[index]=0.0;
```

In this manner the compiler can break down structure definitions and references into primitive types compatible with the storage scheme used by the VIP.

Storage Class

As discussed above, the structure of complex data types is carried in the data rather than the executable code, and data access is resolved by reference rather than by address calculation. There are two exceptions to this in the VIP embodiment: the input data buffer for receiving the image data 114a and the output data buffer for holding the translated image data. These are contiguous arrays of bytes, the size of which are defined at the time a source file is compiled into a method 115a. They are distinguished from other storage types by a storage class not included in standard C.

There is one input buffer and one output buffer. Any variable declared with the input storage class refers to the input buffer. Any variable declared with the output storage class refers to the output buffer. All types defined with one of these storage classes are mapped to the respective memory array, with respect to its beginning. Two special variables are set by the loader before the method 115a is given control of the VIP: input_size and output_size. These define the length in bytes of their respective buffers, and can be used without first declaring them in the method 115a (they are valid by definition). In this respect they are similar to the argc and argv variables defined in standard C, which are not valid for the VIP (they serve no purpose). Using these storage classes and special variables the programmer can map any data type to the input or output buffers. For example:

input unsigned integer raw_data[input_size/4];
    //Declares an array of integers representing the entire raw image from
    image data 114a;
    input float raw_fdata[input_size/4];
    Declares an array of floats representing the entire raw image from
    image data 114a.

The variables raw_data[n] and raw_fdata[n] refer to the same data, but are interpreted as different types.

A single method 115a can process multiple images of different sizes by having the loader initialize the input and output buffers and size variables for each image. The simplest possible image method would be to copy the input buffer directly to the output buffer because the imaging device 104a produced images in the common format. For example:

```
main ( )
{
input byte raw[input_size];
output byte finished[output_size];
finished=raw;
}
```

Note the similarity of the assignment statement to the C++ class assignment syntax. This is a deviation from standard C syntax to allow for implicit parallel processing.

Arrays

Any array type that is used in an assignment statement or in an expression without an explicit index implies that the operation is to apply to the entire array, and that there are no data dependencies among the elements of the array. Consider the following code fragment:

short x[256];
    short y[256];
    x=y*1.414;

This would multiply by the constant 1.414 every element in the y array and assign the results to the corresponding elements in the x array. If the array sizes do not match the operation would be repeated for the number of elements in the smaller array. Implicit in this is that the operation and assignment can be performed in parallel if possible. There is no particular indexing order implied by this statement. An equivalent notation would be:

x[ ]=y[ ]*1.414;

This allows multidimensional arrays to be processed in parallel for a single dimension if desired. For example:

const short column=640;
    const short row=480;
    unsigned byte image[column][row];
    image[ ][12]=255;

This code fragment would assign the value 255 to all elements in row 12 of the image array. When compiling this type of high level code for a conventional microprocessor, the compiler might generate a sequence of machine instructions to explicitly carry out the loop operation implicit in the statement. The VIP compiler, however, simply records an implicit loop operation and any relevant parameters required, and the VIP itself infers the necessary index repetitions. This reduces the size of stored code in the method 115a at the expense of performance. Such tradeoff may be acceptable if the performance of the host system 102 on which the VIP is installed is sufficient to execute the required functions at an acceptable rate.

To summarize, various embodiments of the invention have been described as techniques for improving the portability of still image data using the concept of image objects. It is, however, expected that the described image object and abstract machine technique may be applied to other types of data which are also coherent and bounded, such as certain types of audio or video. In those instances, the image method may be replaced with an audio/video codec typically used for compression and decompression of the audio/video sequence.

The embodiments of the invention described above are, of course, subject to other variations in structure and implementation. For instance, although FIG. 1 illustrates a single object in each imaging or storage device, this is done only to ease the explanation of how the invention works in the given embodiment. Indeed, one of ordinary skill in the art will recognize that multiple objects may be created by each device and transferred to the host system as needed to represent multiple images generated by each device. Also, many other alternatives to the computing architectures of FIGS. 3 and 4 are possible which achieve image capture and image object formation. Therefore, the scope of the invention should be determined not by the embodiments illustrated but by the appended claims and their legal equivalents.

What is claimed is:

1. An article comprising:
    a machine-readable medium having instructions that when executed by a machine cause the step machine to:
    associate first image data and first method as part of an image object, the first method for being executed by an abstract machine to obtain first translated image data based upon the first image, and
    associate second image data with the first method as part of the object, the first method for being executed by the abstract machine to obtain second translated image data based upon the second image data.

2. The article of claim 1 wherein the machine readable medium further comprises instructions that when executed by the machine cause the machine to:
    associate second image data and second method as part of a second object, the second method for being executed by the abstract machine to obtain second translated image data based upon the second image data.

3. The article of claim 1 wherein the first translated data is in the same format as the first data.

4. An article comprising
    a machine-readable medium having instructions that when executed by a machine cause the machine to:
    configure a data processing system to receive first and second objects from first and second imaging devices, respectively, the objects having first and second image data and corresponding methods; and
    execute the corresponding methods of each object by an abstract machine to obtain first and second translated image data based upon the first and second image data, respectively.

5. The article of claim 4 wherein the first and second translated image data are in the same image file format.

6. A method comprising:
transferring an image object having first image data associated with a first method to a processing system;
an abstract machine in said processing system executing the first method for generating first translated image data based upon the first image data,
transferring a second object having second image data associated with a second method to the processing system, the first and second image data being in different formats; and
the abstract machine executing the second method generating second translated image data based upon the second image data, the first and second translated image data being in the same format.

7. The method of claim 6 further comprising:
transferring second image data associated with the first method to the processing system; and
the abstract machine executing the first method generating second translated image data based upon the second image data, the first and second translated image data being in the same format.

8. An imaging device comprising:
image sensor for generating sensor data;
a first memory for storing an image object having first image data being related to the sensor data and first image method for being executed by an abstract machine to obtain translated first image data based upon the first image data,
a processor;
second memory having instructions that when executed by the processor cause processing the sensor data into the first image data, and
an interface to a communication medium for transferring the first image data and the first method to a processing system separate from the imaging device, the processing system being configured with said abstract machine.

9. The imaging device of claim 8 wherein the first image data is the sensor data.

10. The imaging device of claim 9 wherein the processing comprises performing an image processing methodology on the sensor data.

11. The imaging device of claim 8 further comprising:
logic circuitry for processing the sensor data into the first image data.

12. The imaging device of claim 11 wherein the logic circuitry performs a color interpolation algorithm on the sensor data.

13. The imaging device of claim 8 wherein the image object comprises a TIFF file, the TIFF file comprising the first image data and the first image method.

14. The imaging device of claim 8 wherein the translated first image data is part of an image file being in the Device Independent Bitmap (DIB) format.

15. The imaging device of claim 8 wherein the first image data and the translated first image data have the same image file format.

16. A data processing system comprising:
a processor;
memory coupled to the processor and having instructions that when executed by the processor cause the steps of
configuring the system to receive first and second objects from first and second imaging devices, respectively, each object having image data and a corresponding method; and
an abstract machine executing the corresponding method of each object to obtain corresponding translated data based upon the image data.

17. The system of claim 16 wherein
the translated data are part of first and second image files having the same image file format.

18. A method comprising:
transferring an image object having first image data associated with a first method to a processing system;
an abstract machine in said processing system executing the first method for generating first translated image data based upon the first image data,
transferring second image data associated with the first method to the processing system; and
the abstract machine executing the first method generating second translated image data based upon the second image data, the first and second translated image data being in the same format.

* * * * *